United States Patent [19]

Pembroke

[11] 3,940,090

[45] Feb. 24, 1976

[54] VACUUM COLUMN LOADING INTERLOCK

[75] Inventor: Richard W. Pembroke, Tulsa, Okla.

[73] Assignee: Telex Computer Products, Inc., Tulsa, Okla.

[22] Filed: Mar. 18, 1974

[21] Appl. No.: 451,893

[52] U.S. Cl................................ 242/182; 226/97
[51] Int. Cl.²................... G11B 15/58; G11B 23/12
[58] Field of Search ................ 242/182; 226/95, 97

[56] References Cited
UNITED STATES PATENTS 3,795,371  3/1974  Tolini et al. ..................... 242/182

Primary Examiner—Leonard D. Christian
Attorney, Agent, or Firm—Head, Johnson, and Chafin

[57] ABSTRACT

This abstract describes an improvement in conventional vacuum column magnetic tape decks whereby the tape can be threaded directly across from one reel to the other after which it will automatically be threaded into the vacuum chambers, in sequential order. The first reel unwinds to load the first vacuum column and then the second reel unwinds to load the second column. The tape is held stationary over the capstan during the interval between the first entry of the tape into the first vacuum column until the tape has progressed within that column to a selected point after which time the tape is released. Before the tape is released there will be sufficient time available for the tape loop from the second reel to unwind and be locked into the second vacuum column.

4 Claims, 4 Drawing Figures

VACUUM COLUMN LOADING INTERLOCK

BACKGROUND OF THE INVENTION

This invention lies in the field of magnetic tape decks. Still more particularly, it concerns tape decks having two principal vacuum columns. Still more particularly, it concerns apparatus for automatically sequentially loading tape from tape reels into the two vacuum columns.

In tape transport devices utilizing two vacuum columns and a single capstan tape metering means, arrangements for automatically loading the vacuum columns have been a universal problem in the industry. The problem has been that as the tape reels are unreeled, allowing slack tape to drop and to cover the mouths of the two vacuum columns, it will be an impossibility to guarantee that both mouths of the two vacuum columns will be covered and sealed at exactly the same time. If they are not, then the one vacuum column that is operative will draw in the slack tape from both reels and the slack tape from the second reel will never progress downwardly to cover the mouth of the second vacuum column. This problem arises because the vacuum columns are constant tension devices and once a vacuum seal has been made at the mouth opening of one column a constant tension is set up in the tape which prevents slack tape from being freed to seal the mouth of the second column. Hence, unless both columns are sealed with the slack tape at precisely the same instant, slack tape will slip through the metering mechanism, around the capstan and into the vacuum column that has already been sealed. Since it is physically impossible to guarantee that both columns will be sealed at precisely the same time and since the mass of a short piece of tape is extremely low compared to the constant tension in the tape there is constant acceleration of tape from the second column to the first column and a slack tape does not develop, which is required to seal the second column.

SUMMARY OF THE INVENTION

It is a primary object of this invention to provide a simple and dependable means for sequentially loading tape from two tape reels into a first vacuum column and then into a second vacuum column.

This and other objects are realized and the limitations of the prior art are overcome in this invention by providing a vacuum brake by means of which the tape on one side of the capstan is held immovable when there is vacuum on the brake mechanism. In this device the tape is reeled directly from the full reel to the empty reel under the recording heads, over the brake and around the capstan in more or less of a direct line. The first reel, which is on the side of the head assembly corresponding to the capstan begins to unreel tape and eventually enough slack will be developed so that the open mouth of the column is covered and vacuum will then develop in the first vacuum column, since the mouth is now sealed.

The vacuum brake is mounted adjacent the capstan on the side opposite from the first reel, that is, between the capstan and the second reel. This vacuum brake takes vacuum from the first vacuum column at a selected distance in from the mouth of the column so as to provide vacuum to the brake during a selected period of time during which the first reel is being unreeled and loaded into the first vacuum column. As soon as vacuum develops in the first column, that is, as soon as tape starts loading into the first column, a vacuum sensitive switch determines that vacuum is present and closes a circuit. This starts the second reel to slowly unwind, the brake being set on the tape, so that the movement of tape into the first column does not affect the slack tape over the second column. Consequently, as the slack increases the tape will fall over the mouth of the second column and will be drawn into the second column. This will regularly occur before the tape loops into the first column has progressed to the point where the vacuum is removed from the conduit leading to the vacuum brake. In other words, the length of time that vacuum is on the vacuum brake is made great enough to insure that the tape will be positively threaded into the second column. Thereafter, as the tape loop increases in the first column the mouth of the conduit leading to the vacuum brake is uncovered, the brake becomes free and remains free and the tape now held securely in each of the vacuum columns progressively moves to its neutral balance point and the servo mechanism takes over control of the tape.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Figure 1:
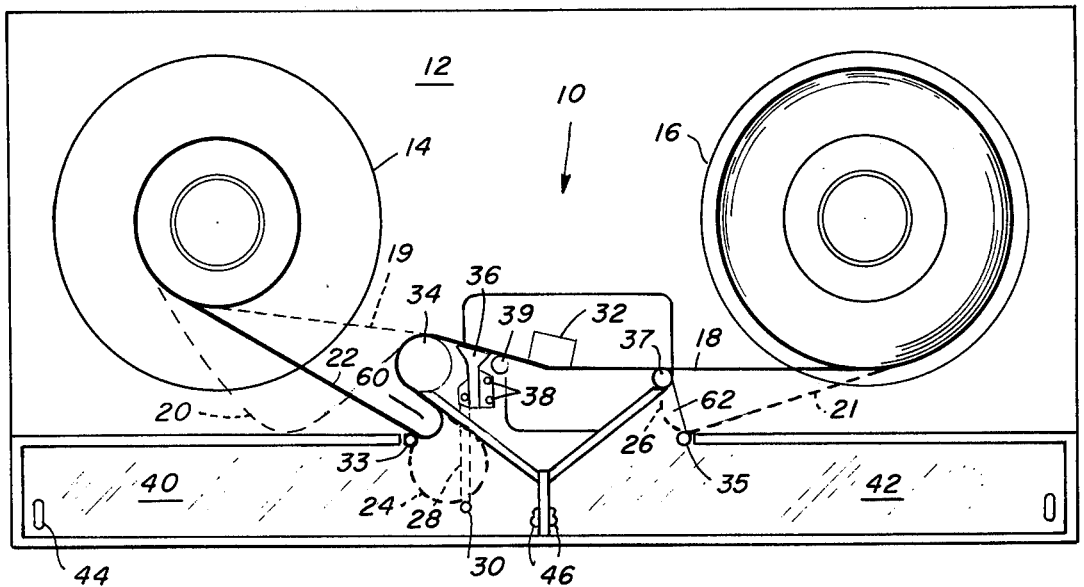
FIG. 1 is an elevation view which represents the face of the tape deck illustrating the original tape contour and successive contours of the tape during the loading process.

Referring now to the drawings there is shown in FIG. 1 a tape deck 12 and a tape control mechanism indicated generally by the numeral 10. There are two reels of tape, a first (or machine) reel 14 and a second (or file) reel 16. There are two vacuum columns at the bottom of the tape deck, a first column 40 and a second column 42. There is a magnetic head assembly 32 mounted between the two reels and a single capstan 34 mounted between the head assembly 32 and the first reel 14. There is a free roller 37 and slide 39 over which the tape 18 runs, progressing from the second reel 16 over the first roller 37 under the tape head 32 over the roller 39 and over the capstan 34. In the initial loading position the tape proceeds from the top of the capstan 34 via dashed line 19 to the first reel 14.

Figure 4:
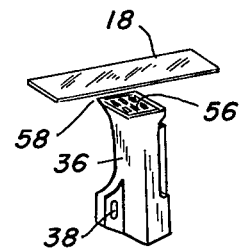
FIG. 4 is a detailed view which illustrates the vacuum brake.
Figure 3:
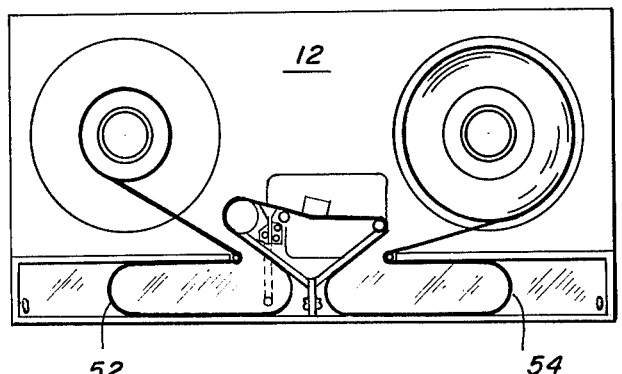
FIG. 3 is a view which illustrates the final operating condition of the tape in the tape columns.

There is a vacuum brake 36 which is mounted to the tape deck 12. As shown to an enlarged scale in FIG. 4, it is separated slightly by a gap 58 from the tape 18 strung over the roller 39 and the capstan 34. The vacuum brake has a plurality of small openings 56 which are connected by a conduit 28 to an opening 30 in the first vacuum column 40. This opening 30 is displaced from the mouth 60 of the first column 40 so that as long as the mouth 60 is sealed by the tape 22 there will be vacuum at the point 30 and, therefore, the vacuum brake 36 will be energized holding the tape 18 in contact with the openings 56. As the tape loop 22 increases to the dashed position 24, which takes a selected amount of time, depending upon the rate of unreeling of the motor driving the reel 14, the opening will change from a vacuum condition to an atmospheric condition as the loop enlarges to surround the opening 30. Thereafter, the vacuum is removed from the brake 36 and the tape 18 which has been held to the brake 36 will then be released and can freely move in one direction or the other.

There are openings 46 in both columns which are connected to a vacuum supply. As long as the mouths 60 and 62 of the two columns are uncovered even though vacuum is connected to the openings 46 there will be substantially atmospheric pressure in the columns. However, as the reel 14 unreels, the tape 19 drops to a lower position such as 20, making a slack loop which, as it falls, will eventually cover the mouth 60 of the first column and when it seals the mouth, vacuum will be created in the first column 40 and the brake 36 will be energized.

At the same time, there is a vacuum sensitive switch 44 which when the vacuum develops in the first column 40, will close the switch, which will then start unwinding the reel 16. A slack will develop between the reel 16 and the roller 37 and as the slack develops the tape 21 will eventually form a loop 26 covering the mouth of the second column 42, creating a vacuum condition in that column. Thereafter, any slack developed by the unreeling of reel 16 will cause the tape to be pulled into a larger loop inside the second column.

Figure 2:
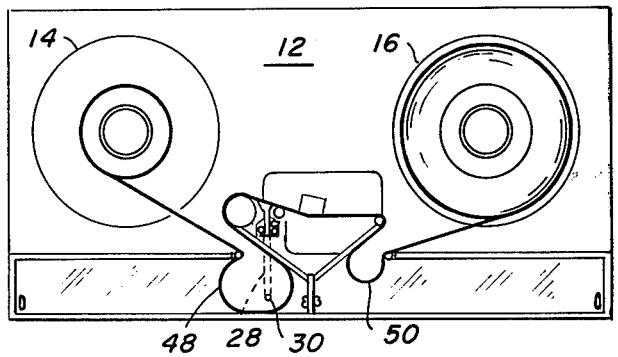
FIG. 2 is a view which illustrates the condition of the tape in the vacuum columns after tape has entered the mouths of both columns.

This condition is indicated in FIG. 2 which occurs sometime after the loop 26 has been formed, just barely sealing the mouth of the second column. Thereafter, the loop 48 develops, which uncovers the port 30 and conduit 28 removing the vacuum from the brake 36. So long as both mouths of the two columns have been covered there is no possibility of tape being carried from one to the other because there is now equal force on the two loops due to the vacuum being substantially the same on each vacuum column. In this condition the brake can be removed because it is no longer needed. Thereafter, as the reels 14 and 16 continue to unreel their tape, the internal loops in the vacuum columns extend to their nominal operating positions 52 and 54 where they and the reels are now under servo control.

It is seen that this apparatus will positively load both vacuum columns and it will do it in a sequential manner to avoid any possibility that one and only one of the vacuum columns will be loaded, which will make it impossible to operate the tape deck. The important thing is that only one reel operates in the beginning, slowly unwinding forming a loop that will cover the mouth of the first column. As soon as this happens the vacuum brake is set. Tape cannot move from the second reel around the capstan and into the first column. This is prevented by the vacuum brake. At the same time, the vacuum created in the first column closes a switch which starts the second reel to unwind and its loop continues to increase in size until it covers the mouth 62 of the second column. Thereafter tape is drawn into both columns. When the tape loop 24 gets large enough vacuum is removed from the brake and normal servo operation is thereafter guaranteed.

This apparatus has the advantage that it is a simple positive automatic interlock between the vacuum in the first column and the control of the second reel to insure both vacuum columns being loaded. This is fully automatic and does not require the attention of the operator.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In a vacuum column-controlled magnetic tape deck, having a first and a second tape reels, a first and a second principal vacuum columns, and a single capstan at the mouth of said first column, near said first reel, the improvement in apparatus for automatically sequentially loading tape into said vacuum columns, comprising:
   a. vacuum brake means to hold the tape extending between said reels, said brake mounted between said capstan and said second reel, and tubular means to connect said brake to a point spaced inside of and a selected distance from the mouth of said first column;
   b. means to apply vacuum to said first and second vacuum columns;
   c. means to slowly unreel said first reel, whereby said tape will cover and seal the mouth of said first column;
   whereby when said tape seals the mouth of said first column vacuum will form in said first column and through said tubular means to said brake;
   d. vacuum switch means responsive to the formation of vacuum in said first column to apply power to slowly unreel said second reel;
   whereby said tape will cover and seal the mouth of said second column and said tape will be drawn into said second column; and
   e. means responsive to the slow unreeling of said first reel and the movement of said tape inside said first column past said tubular means to remove the vacuum from said brake after the mouth of said second column has been sealed.

2. In a vacuum column-controlled magnetic tape deck having a first and a second reel, a first and a second principal vacuum column, a single capstan mounted at the mouth of said first column near said first reel, vacuum brake means responsive to the vacuum at a selected point in said first column, and mounted between said capstan and said second reel, the method of sequentially loading tape into said first and said second columns comprising the steps of:
   a. stretching the tape between said first and second reels; over said brake and said capstan;
   b. applying vacuum to said first and second vacuum columns;
   c. applying power to slowly unreel said first reel until said tape covers and seals the mouth of said first column, whereby said tape will be drawn into said first column and vacuum will form in said first column;
   d. responsive to the vacuum at a selected point in said first column applying vacuum to said brake, through a lead from said selected point to said brake, whereby said tape is locked to said brake;

e. responsive to the vacuum in said first column applying power to slowly unreel said second reel, whereby said tape will cover and seal the mouth of said second column;

whereby said tape will be drawn into said second column; and f. responsive to the movement of the tape in said first column past said selected point, releasing said vacuum brake means by uncovering the vacuum lead from said first column to said brake.

3. The tape deck as in claim 1 in which said means responsive to the formation of vacuum in said first column to slowly unreel said second reel comprises switch means responsive to the vacuum in said first column.

4. The tape deck as in claim 1 in which the selected distance of said point from the mouth of said first column is dependent upon the time taken for the tape in said first column to move from said mouth to said point, which time is greater than the time to unreel tape from said second reel to seal the mouth of said second column.

* * * * *